(12) United States Patent
Galvin

(10) Patent No.: US 7,718,558 B2
(45) Date of Patent: May 18, 2010

(54) COMPOSITE FABRIC WITH HIGH WATER REPELLENCY

(75) Inventor: Jennifer Marie Galvin, Nashville, TN (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 207 days.

(21) Appl. No.: 11/788,354

(22) Filed: Apr. 19, 2007

(65) Prior Publication Data

US 2007/0249252 A1    Oct. 25, 2007

Related U.S. Application Data

(60) Provisional application No. 60/793,557, filed on Apr. 20, 2006.

(51) Int. Cl.
*B32B 5/26* (2006.01)

(52) U.S. Cl. .................................................... 442/382

(58) Field of Classification Search ................ 442/327, 442/400, 401, 382; 52/745.06
See application file for complete search history.

(56) References Cited

U.S. PATENT DOCUMENTS

2005/0170726 A1* 8/2005 Brunson et al. ............. 442/327
2006/0160453 A1* 7/2006 Suh ............................ 442/389
2007/0054579 A1* 3/2007 Baker et al. ................. 442/364

FOREIGN PATENT DOCUMENTS

EP  0742305 B1  11/1996
EP  0880628      12/1996

* cited by examiner

*Primary Examiner*—Arti Singh-Pandey

(57) ABSTRACT

A composite fabric for use as a roof lining material made of a multilayer base sheet of a meltblown web of bicomponent fibers sandwiched between two spunbond sheet layers of bicomponent sheath-core fibers and a spunbond top sheet of bicomponent sheath-core fibers wherein the base sheet and top sheet are joined in a manner such that the moisture vapor permeability of the composite fabric is not substantially reduced from the moisture vapor permeability of the base sheet alone.

5 Claims, No Drawings

COMPOSITE FABRIC WITH HIGH WATER REPELLENCY

CROSS REFERENCE TO RELATED APPLICATIONS

This application claims the benefit of U.S. Provisional application No. 60/793,557 filed Apr. 20, 2006.

BACKGROUND OF THE INVENTION

1. Field of the Invention

The invention relates to composite nonwoven fabrics suited for use as breathable roof lining.

2. Description of the Related Art

Moisture vapor permeable roof lining or roofing underlayment materials are intended to protect the interior of a building from the ingress or penetration of water or rain, while allowing moisture vapor to escape from within the building. As such, materials in this application need a high degree of liquid barrier and moisture vapor permeability.

EP Patent Number 880628 B discloses a moisture vapor permeable roofing underlayment comprising a meltblown layer sandwiched between two spunbond layers, optionally treated with hydrophobic additives. The meltblown layer is heat treated in order to make it more film-like. The patent discloses the use of polypropylene and polyurethane in the meltblown layer.

EP Patent Number 742305 B discloses a moisture vapor permeable composite fabric suitable for building construction uses, including roofing underlayment, in which a meltblown layer is sandwiched between two spunbond layers. The meltblown layer is compressed in order to reduce the pore size. Hydrophobic additives may be included in the layers.

It would be desirable to have a roof lining material with a high degree of liquid barrier and with good moisture vapor permeability that does not require special treatment of the meltblown layer to achieve a low pore size.

DEFINITIONS

The term "polyethylene" (PE) as used herein is intended to encompass not only homopolymers of ethylene, but also copolymers wherein at least 85% of the recurring units are ethylene units, and includes "linear low density polyethylenes" (LLDPE) which are linear ethylene/α-olefin copolymers having a density of less than about 0.955 g/cm$^3$, and "high density polyethylenes" (HDPE), which are polyethylene homopolymers having a density of at least about 0.94 g/cm$^3$.

The term "polyester" as used herein is intended to embrace polymers wherein at least 85% of the recurring units are condensation products of dicarboxylic acids and dihydroxy alcohols with linkages created by formation of ester units. Examples of polyesters include poly (ethylene terephthalate) (PET), which is a condensation product of ethylene glycol and terephthalic acid, and poly(1,3-propylene terephthalate), which is a condensation product of 1,3-propanediol and terephthalic acid.

The terms "nonwoven fabric", "nonwoven sheet", "nonwoven layer", and "nonwoven web" as used herein refer to a structure of individual fibers, filaments, or threads that are positioned in a random manner to form a planar material without an identifiable pattern, as opposed to a knitted or woven fabric. Examples of nonwoven fabrics include meltblown webs, spunbond webs, and composite sheets comprising more than one nonwoven web.

The term "machine direction" (MD) is used herein to refer to the direction in which a nonwoven web is produced (e.g. the direction of travel of the supporting surface upon which the fibers are laid down during formation of the nonwoven web). The term "cross direction" (CD) refers to the direction generally perpendicular to the machine direction in the plane of the web.

The term "spunbond fibers" as used herein means fibers that are melt-spun by extruding substantially continuous molten thermoplastic polymer material as fibers from a plurality of fine, usually circular, capillaries of a spinneret with the diameter of the extruded fibers then being rapidly reduced by drawing and then quenching the fibers.

The term "meltblown fibers" as used herein, means fibers that are melt-spun by meltblowing, which comprises extruding a melt-processable polymer through a plurality of capillaries as molten streams into a high velocity gas (e.g. air) stream.

The term "spunbond-meltblown-spunbond nonwoven fabric" (SMS) as used herein refers to a multilayer composite sheet comprising a web of meltblown fibers sandwiched between and bonded to two spunbond layers. Additional spunbond and/or meltblown layers can be incorporated in the composite sheet, for example spunbond-meltblown-meltblown-spunbond webs (SMMS), etc.

The term "multiple component fiber" as used herein refers to a fiber that is composed of at least two distinct polymeric components that have been spun together to form a single fiber. At least two polymeric components are arranged in distinct, substantially constantly positioned zones across the cross-section of the multiple component fibers, the zones extending substantially continuously along the length of the fibers.

The term "bicomponent fiber" is used herein to refer to a multiple component fiber that is made from two distinct polymer components, such as sheath-core fibers that comprise a first polymeric component forming the sheath, and a second polymeric component forming the core; and side-by-side fibers, in which the first polymeric component forms at least one segment that is adjacent at least one segment formed of the second polymeric component, each segment being substantially continuous along the length of the fiber with both polymeric components being exposed on the fiber surface. Multiple component fibers are distinguished from fibers that are extruded from a single homogeneous or heterogeneous blend of polymeric materials. The term "multiple component nonwoven web" as used herein refers to a nonwoven web comprising multiple component fibers. A multiple component web can comprise single component and/or polymer blend fibers, in addition to multiple component fibers.

DETAILED DESCRIPTION OF THE INVENTION

The current invention in one embodiment relates to a composite nonwoven fabric for use as a roof lining (also referred to as a roof underlayment) material. The composite fabric includes a multilayer base sheet joined to a spunbond top sheet. The composite fabric provides an effective barrier to the penetration of liquid, e.g., to the ingress of rain into a building, while remaining permeable to the egress of moisture vapor out of the building.

The multilayer base sheet is made of a meltblown web sandwiched between two spunbond fabric layers. The base sheet has a basis weight of between about 150 and 170 g/m$^2$, wherein typically the spunbond layers are each about 60 g/m$^2$ and the meltblown layer is about 30 g/m$^2$. The mean pore size of the base sheet is between about 3 micrometers and about 8 micrometers. The weight of the meltblown web is about 25-40% of the total weight of the base sheet, while the weight of the two spunbond layers is about 60-75% of the total weight of the base sheet. The two spunbond layers can have either the same or different basis weights. If the basis weights are different, the spunbond layer that is joined to the spunbond top sheet typically has the higher basis weight. The spunbond layers of the multilayer base sheet are formed from continuous sheath-core fibers. The spunbond layers can be prepared in a bicomponent spunbond process using linear low density polyethylene (LLDPE) as the sheath component and polyethylene terephthalate (PET) as the core component. The PET resin can be crystallized and dried before use in order to control the moisture level of the PET to give the desired melt viscosity. The PET and LLDPE polymers can be heated and extruded in separate extruders, filtered, and metered to a bicomponent spin block designed to provide a sheath-core filament cross section. The polymers are metered to provide fibers of the desired ratio of weight of the sheath component to that of the core component, typically between about and about. The multilayer base sheet can be made by having all spin beams in-line, on the same machine, such that each layer is spun on top of the previous layer and then thermally point bonding the composite together. Alternately the base sheet can be formed by making each layer independently and then thermally point bonding the three layers together.

The spunbond fibers typically have a diameter between about 10 and 25 micrometers. Additives can be included in one or both of the molten polymer streams, to provide a desired color or to improve the UV and thermal degradation resistance of the fabric.

The meltblown web layer of the base sheet is formed from bicomponent fibers having either a side-by-side or sheath/core cross-section. The bicomponent fibers are typically made from LLDPE and PET polymeric components as described above. The ratio of the polyester component to the polyethylene component in the meltblown fibers is typically between about 50:50 and about 30:70 by weight. The PET can be dried and crystallized prior to use, as described above. The PET and the PE can be heated in separate extruders and extruded, filtered, and metered to a bicomponent spin block designed to provide fibers having the desired cross-sections. The filaments emerge from the spin pack into a high pressure, high temperature air stream and below the spin pack, quench air is directed at the filaments from two opposing quench boxes. The filaments are then deposited onto a laydown belt assisted by vacuum suction. Additives can be included in one or both of the molten polymer streams, to provide a desired color or to improve the UV and thermal degradation resistance of the fabric. The fibers of the meltblown layer typically have diameters between about 1 and 7 micrometers. Multiple meltblown layers can be used.

The multilayer base sheet can be topically finished with a liquid repellent coating by immersion into a suitable finish, such as a fluorochemical, to saturate the sheet. The base sheet is then dried and cured until an alcohol repellency value of greater than 4 is achieved.

The top sheet is a spunbond sheet formed from bicomponent, sheath-core continuous fibers prepared as described above for the spunbond layers in the multilayer base sheet. The top sheet has a basis weight of about 30 g/m². The top sheet can be topically finished, also.

To form the composite fabric, the base multilayer sheet and the top spunbond sheet are typically joined together in a standard hot-melt adhesive process. The adhesive can be applied to the base sheet and the top spunbond sheet then applied to the adhesive. An acceptable adhesive is Bostik adhesive H2900, at an add-on level of 10-15 g/m², applied in a random pattern over the entire width of the sheet. Other similar hot melt adhesive types can also be used, though the add-on level can be varied to achieve acceptable peel adhesion strength. Standard, commercially available hot melt adhesive application equipment can be used. Any of a variety of commercially available nozzle types and/or glue application patterns can be used to apply the adhesive to the sheet, including but not limited to random spray, slot, lines of overlapping circles, lanes of continuous omega-shaped lines, etc. It is believed that variation of the adhesive process conditions does not significantly affect the properties of the final composite fabric, as long as enough adhesive is applied to achieve an average machine direction (MD) peel adhesion value of greater than about 150 g Alternatively, the top sheet and the base sheet can be joined together via ultrasonic bonding. Other methods such as thermal calendering can be used to join the top sheet and base sheet, but care must be taken to avoid closing the pores of the base sheet, which could adversely affect the air permeability.

Test Methods

In the description above and the examples that follow, the following test methods are employed to determine various reported characteristics and properties. ASTM refers to the American Society for Testing and Materials. TAPPI refers to Technical Association of Pulp and Paper Industry. INDA refers to the Nonwovens fabric association.

Basis Weight is a measure of the mass per unit area of a fabric or sheet and is determined by ASTM D-3776, which is hereby incorporated by reference, and is reported in g/m².

Melting Temperature (also referred to as the melting point) of a polymer as reported herein is measured by differential scanning calorimetry (DSC) according to ASTM D3418-99, which is hereby incorporated by reference, and is reported as the peak on the DSC curve in degrees Centigrade. The melting point was measured using polymer pellets and a heating rate of 10° C. per minute.

Frazier Air Permeability is a measure of the air permeability of a sheet and was measured according to ASTM D 737, and reported in units of m³/min/m².

Mean Pore Size and Pore Size Distribution were measured by a capillary flow porometer available from Porous Materials, Inc. (Ithaca, N.Y.), following test method ASTM F316-03.

Hydrohead is a measurement of resistance to penetration by a column of water, and was measured according INDA 80.6.

Alcohol Repellency is a measurement to holdout of drops of varying concentrations of isopropyl alcohol, and was measured according to INDA 80.8

Bundesmann rain-shower test measures the resistance to penetration of water, and was run according to ISO 9865: 1991 with the following modifications. Test fabric is placed over a flat wood support. The test is stopped periodically, every 15 minutes to several hours, depending on the fabric performance and the fabric is lifted to determine if the wood is wet underneath the fabric. Test is stopped when the water has wet through the fabric.

Moisture Vapor Transmission Rate (MVTR) measures the rate at which water vapor passes through the fabric, and was measured using a MOCON instrument, per test method IST 70.4.

EXAMPLES

These examples demonstrate the preparation of a composite fabric for roof lining. The spunbond layers of the base sheet were formed from sheath-core spunbond fibers prepared in a bicomponent spunbond process using linear low density polyethylene (LLDPE) with a melting point of about 126° C. as the sheath component and PET with a melting point of about 260° C. and an intrinsic viscosity of 0.64 as the core component. In these examples, to provide adequate strength to the multilayer base sheet, one spunbond layer may have a sheath/core ratio of 50:50, while the other layer may have a ratio of 30:70. The adhesive used was Bostik H2900 at an add-on level of 10-15 g/m$^2$ with a random pattern over the width of the sheet.

The meltblown layer of the base sheet was formed from bicomponent fibers having a side-by-side cross-section made from LLDPE (melting point 125° C.) and PET (melting point about 260° C.) polymeric components. The ratio of the polyester component to the polyethylene component in the meltblown fibers was typically 65:35 by weight. The PET was crystallized prior to use to control the moisture level of the PET and thereby adjust the melt viscosity.

In these examples, the spunbond and meltblown spin beams were produced in-line on the same machine. The first spunbond layer was deposited onto a laydown belt, and then each subsequent layer was spun on top of the previous layer. The SMS composite fabric was then thermally point bonded.

The multi-layer base sheet was topically finished by immersion into fluorochemical finish formulation (aqueous emulsion) to saturate the sheet. The sheet was passed through a nip to remove excess finish. The wet-pickup was in the range of 80-125%. The fabric was dried and cured, until an alcohol repellency value of greater than 4 was achieved. The fluorochemical finish emulsion contained Zonyl® 8482 fluorinated acrylic polymer emulsion (obtained from E. I. du Pont de Nemours and Company), Freepel® 1225 extender (obtained from Noveon, Inc., Cleveland, Ohio), Zelec® TY electroconductive powders (antistatic agent, obtained from Stepan Company, Northfield, Ill.), 1-hexanol (wetting agent, obtained from Sasol North America, Inc., Houston, Tex.), with the balance of the finish emulsion being water. The amount of each finish component used in the bath was adjusted depending on the wet-pickup, to maintain a constant add-on rate of each finish component. The Zonyl 8482 was typically used in the range of 1-3%, the Freepel was typically used in the range of 1-3%, the Zelec TY was typically used in the range of 0.15-0.5%, and the hexanol was used at about 0.6%. The percentages are by weight of bulk incoming ingredients.

The spunbond top sheet of the composite fabric was a bicomponent spunbond and prepared as described above for the base sheet, with a basis weight of about 30 g/m$^2$. The sheath/core ratio of the fibers was 50:50, by the weight of the components. This layer was topically finished as described above, except that the finish formulation did not contain the Freepel®.

Examples 1-2 and Comparative Example A

In Example 1, each of the two spunbond layers of the base sheet had equal basis weights of about 60 g/m$^2$. The adhesive was applied to the top spunbond layer of the base sheet, which had a sheath/core ratio of 30:70. The other spunbond layer had a sheath/core ratio of 50:50. The top sheet (as described above) was applied to the adhesive.

In Example 2, the two spunbond layers of the base sheet had different basis weights with the top layer about 75 g/m$^2$ and the bottom layer about 45 g/m$^2$. The top layer had a sheath/core ratio of 50:50 and the bottom layer had a sheath/core ratio of 30:70. The adhesive was applied to the heavier layer and the top sheet was applied to the adhesive.

For both Examples 1 and 2, the meltblown layer had a basis weight of about 48 g/m$^2$.

Comparative Example A is a control sample that is the same as the base sheet of Example 1.

TABLE 1

| Ex. No. | Basis Wt. oz/yd$^2$ (g/m$^2$) | Frazier Air Permeability CFM/ft$^2$ (m$^3$/min/m$^2$) | Mean Flow Pore Size μm | HH cm | MVTR g/m$^2$/day | Bundesmann test hours |
|---|---|---|---|---|---|---|
| A | 5.0 (170) | 4.19 (1.28) | 3.36 | 154 | 21750 | 1 |
| 1 | 6.19 (210) | 4.10 (1.25) | 3.32 | 156 | 19920 | 3 |
| 2 | 6.10 (207) | 3.60 (1.10) | 3.25 | 157 | 20700 | 2 |

The results above demonstrate that the inventive examples, in contrast to the control, had significantly better resistance to water penetration without any sacrifice in air permeability.

Comparative Examples B and C

Comparative Example B

This example demonstrates an SMS structure that was made by making the top spunbond layer heavier than the bottom layer. This fabric was made according to the procedure in Example 1, except that the polymer throughput for the first spunbond beam was adjusted to give a layer that was about 75 g/m$^2$, and the polymer throughput for the second spunbond beam was adjusted to give a layer that was about 45 g/m$^2$.

This example demonstrates that increasing the basis weight of one of the spunbond layers of the base sheet does not provide any significant increase in water penetration resistance as shown in Table 2.

Comparative Example C

This example demonstrates the composite structure made by melt spinning the base layer directly onto the top layer. The top layer was made as described in Example 1, except that it was not repellent treated. The top layer was thermally point bonded and wound onto a roll prior to use. This layer was then unwound ahead of the first spunbond beam for the multilayer base sheet, and then the multilayer base sheet was spun directly onto the top layer, using spinning conditions as described in Example 1. The composite structure was then thermally point bonded. The composite structure was repellent finished as described for the base sheet in Example 1. This example demonstrates that increasing the weight of the top spunbond layer by spinning directly onto a top layer does not increase the resistance to water penetration as shown in Table 2.

TABLE 2

| Example No. | Frazier CFM/ft² (m³/min/m²) | Hydrohead cm | Bundesmann Test hour |
|---|---|---|---|
| B | 3.6 (1.1) | 169 | 1 |
| C | 4.8 (1.5) | 93 | 0.03 |

I claim:

1. A composite fabric for use as a roof lining material, comprising:
    (a) a multilayer base sheet comprising a meltblown web of bicomponent fibers sandwiched between two spunbond sheet layers of bicomponent sheath-core fibers; and
    (b) a separate top sheet comprising a spunbond sheet layer of bicomponent sheath-core fibers;
    wherein the base sheet and top sheet are joined in a manner such that the moisture vapor permeability of the composite fabric is not substantially reduced from the moisture vapor permeability of the base sheet alone.

2. The composite fabric of claim 1, wherein the bicomponent fibers of the meltblown web are in an arrangement selected from the group consisting of side-by-side and sheath/core.

3. The composite fabric of claim 1, wherein the sheath comprises polyethylene and the core comprises polyester.

4. The composite fabric of claim 1, wherein the top sheet and the base sheet were joined by one of the group consisting of adhesive bonding, point bonding and ultrasonic bonding.

5. The composite fabric of claim 1, wherein the water penetration is at least two hours when measured by the modified Bundesmann test.

* * * * *